Oct. 30, 1956     A. C. OTTO ET AL     2,768,590

HAND RAIL ATTACHMENT FOR MOTOR VEHICLES

Filed May 7, 1952

Arthur C. Otto
Earl A. Otto
INVENTORS

BY *C. A. Snow & Co.*
ATTORNEYS.

United States Patent Office 2,768,590
Patented Oct. 30, 1956

2,768,590
HAND RAIL ATTACHMENT FOR MOTOR VEHICLES

Arthur C. Otto and Earl A. Otto, Chilton, Wis.

Application May 7, 1952, Serial No. 286,457

1 Claim. (Cl. 105—354)

This invention relates to an attachment in the form of a hand rail adapted to be installed within a motor vehicle body at a point adjacent to the top thereof and above the seats of the motor vehicle, the hand rail affording means whereby disabled persons may assist themselves in moving into or out of a motor vehicle or along the seats thereof, by grasping the rail and lifting themselves by their own arms.

An important object of the invention is to provide a device of this character which is adjustable throughout the length of the vehicle body, to the end that the device is available for use by persons seated in the front or rear seat of such vehicle.

Another object of the invention is to provide a hand rail of this character which may be readily installed within a motor vehicle body, eliminating the necessity of making alterations in the vehicle body construction, to mount the hand rail.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing.

Figure 1:
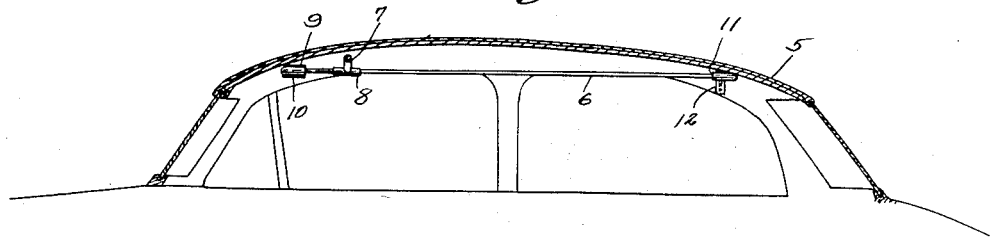
Figure 1 is a fragmental sectional view through the body of a car illustrating a hand rail mounted within, constructed in accordance with the invention.
Figure 2:
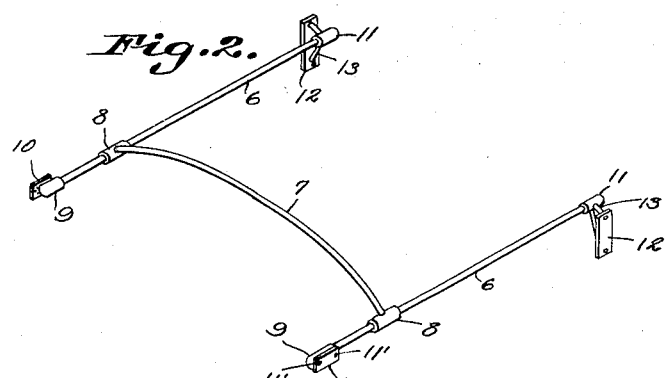
Fig. 2 is a perspective view of the hand rail and its supporting rods.
Figure 3:
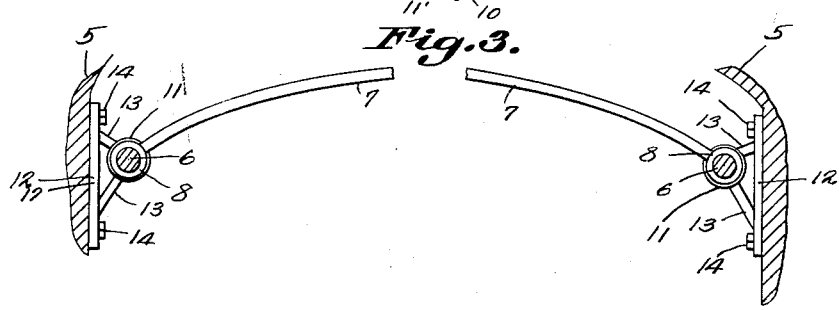
Fig. 3 is a transverse sectional view illustrating the supporting rods as secured within a motor vehicle body top.
Figure 4:
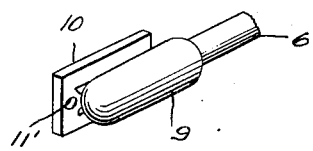
Fig. 4 is a view illustrating the forward bracket used in mounting the supporting rods of the hand rail.
Figure 5:
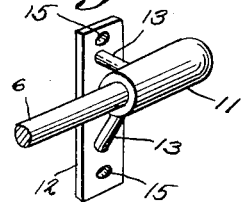
Fig. 5 is a perspective view illustrating the rear bracket used in mounting the supporting rods.

Referring to the drawing in detail, the reference character 5 indicates the top of a motor vehicle body in which the hand rail forming the subject matter of the present invention, is mounted. The reference character 6 indicates the supporting rods that provide the support for the hand rail 7, the hand rail 7 having tubular members 8 formed at the ends thereof, to which the hand rail is connected at points intermediate the ends of the tubular members.

Due to this construction it will be seen that the hand rail is adjustable longitudinally of the supporting rods 6 and when the device is positioned within the top of the motor vehicle, the hand rail may be slid longitudinally of the supporting rods, making the hand rail available for use by occupants of the front or rear seats of the vehicle body.

The forward ends of the supporting rods 6 are positioned in the sockets 9 of the brackets 10, the brackets 10 having openings 11' for the reception of securing screws, whereby the brackets are secured to the frame of the body 5.

The rear ends of the supporting rods 6 are fitted in the sockets 11 which are secured to the top 5, adjacent to the rear end thereof, the sockets 11 being secured to the brackets 12 by means of the legs 13 so that the sockets 11 are spaced appreciable distances from the top 5, to compensate for the curvature in the top structure.

These brackets 12 are secured within the frame of the top 5, by means of bolts 14 which pass through the openings 15 of the brackets 12.

As shown, the hand rail 7 is curved in the arc of a circle so that the hand rail follows the general contour of the curved top, so that the bar will not in any way interfere with the entrance or exit of persons passing to and from the vehicle.

In the use of the device, the hand rail 7 may be moved to a position where the person using the hand rail will have ready access thereto and by gripping the hand rail the person may lift himself by his arms to relieve his body of undue strain in passing to or from the vehicle.

Because the hand rail is adjustable longitudinally of the supporting rods, it will be obvious that the hand rail may be moved to a position directly over occupants of the front or rear seat of the vehicle.

From the foregoing detailed description it is believed that further detail description of the operation of the device will be unnecessary.

Having thus described the invention, what is claimed is:

An attachment of the class described, comprising pairs of socket members secured within a vehicle top in aligning horizontal spaced relation with respect to each other with the open sides of the socket members of each pair disposed opposite to each other, side rails having their ends removably held within said socket members, supporting said rails in spaced relation with the top of the vehicle, a hand rail, elongated tubular members secured to the ends of said hand rail and disposed transversely with respect to said hand rail, and said tubular members being mounted on and slidable over said side rails for adjustment longitudinally of said side rails.

References Cited in the file of this patent

UNITED STATES PATENTS

| 2,108,828 | Quidas | Feb. 22, 1938 |
| 2,668,647 | Osburn et al. | Feb. 9, 1954 |

FOREIGN PATENTS

| 498,714 | Germany | May 26, 1930 |